United States Patent Office 3,737,395
Patented June 5, 1973

3,737,395
PREPARATION OF CARBON SUPPORTED PROMOTED NOBLE METAL CATALYSTS
Melvin R. Arnold, Knoxville, Tenn., and Albert Schrage, East Orange, N.J., assignors to Dart Industries Inc., Los Angeles, Calif.
No Drawing. Filed Aug. 18, 1971, Ser. No. 172,943
Int. Cl. B01j 11/06
U.S. Cl. 252—447                   6 Claims

ABSTRACT OF THE DISCLOSURE

Carbon supported promoted noble metal catalysts having increased activity may be prepared by adding a basic compound to a slurry of a soluble noble metal compound, a soluble metallic promoter at a high valency state and particulate carbon to deposit a noble metal compound and a high valency metallic promoter onto the particulate carbon and then co-reducing the noble metal compound to a metallic form and the high valency metallic promoter to a low valency metallic promoter.

---

This invention relates to the production of supported hydrogenation catalysts and, in particular, to a method for producing such catalysts having high hydrogenation activity.

In hydrogenation and other similar processes, it is conventional to use a catalyst which comprises a noble metal, such as palladium or platinum, in quantities of about 0.1–25% by weight deposited upon a support material. The support material for hydrogenation processes is preferably finely divided carbon which, by reason of its fine state of subdivision, requires deposition from solution of an insoluble noble metal compound, followed by reduction to the metal. Such catalysts are often rendered more active by adding minor amounts (0.5–3% by weight) of a promoter, which are typically oxides, hydroxides, or metals of Groups II–VIII of the Periodic Table of Elements. Especially preferred promoters for the platinum or palladium on carbon catalysts are oxides or hydroxides of iron, nickel, cobalt, magnesium, aluminum, manganese, chromium, vanadium and tungsten. Processes of using such catalysts are well known and reference to one such process is found in U.S. Pat. 2,857,337 for hydrogenation of nitro compounds to produce amines.

It is desirable in producing carbon supported noble metal catalysts to obtain both high activity and high selectivity. Some of the primary considerations affecting activity are the uniformity of deposition of the metals on the carbon and the surface area of the catalysts. A uniform, thin, firm and adherent coating on a high surface area catalyst is desirable for maximum catalytic selectivity and activity.

In the preparation of promoted noble metal supported catalysts the promoters are frequently precipitated before, during, or after precipitation of the noble metal. The promoters when precipitated are frequently found to form hydrous gels which are very difficult to distribute on the porous carbon support. It is also theorized that the uniformity of deposition of metal is interrupted by these gels to give lower activity catalysts.

It is, accordingly, an object of this invention to provide a method of preparing high activity catalysts having uniform and controlled deposition of noble metal and a metallic promoter on carbon which avoids formation of gels and allows more economic and efficient purification of the catalysts.

In accordance with this invention an aqueous slurry is formed of a water soluble noble metal compound, a water soluble metallic promoter compound in its higher valency state and particulate carbon. A precipitant is then added to coprecipitate the noble metal and metallic promoter in their insoluble hydroxide forms followed by coreduction of the noble metal to its metallic form and the metallic promoter to a lower valency. It is emphasized that the metallic promoter must not be in its lowest valent state when precipitation occurs otherwise an insoluble gel is formed that become non-uniformly distributed on the support leading to a catalyst of reduced activity.

More specifically, the aqueous slurry may be formed by any sequence of additions of the noble metal compound, metallic promoter and carbon to the aqueous medium. A preferred sequence involves first forming an aqueous acidic solution of the soluble noble metal compound, which will generally have a pH of about 0 to 3, and then adding carbon powder to form a slurry containing about 2 to 20% by weight solids. The soluble metallic promoter compound is then added to the slurry.

Coprecipitation of both the noble metal and metallic promoter in the form of hydroxides onto the particulate carbon is then accomplished by adding a basic precipitant to the slurry. Precipitation generally begins at about a pH of 5 to 6 and continues to completion by further addition of the basic precipitant sufficient to maintain the pH of the slurry on the alkaline side.

After coprecipitation is achieved a reducing agent is added to the slurry and co-reduction of both the noble metal and the metallic promoter results. A mild reducing agent is used which effectively reduces the precipitated noble metal hydroxide to its metallic form while at the same time reduces the metallic promoter to a lower valent state.

The temperature of the slurry during coprecipitation and coreduction are not considered particularly significant to the practice of the invention. Room temperatures would be entirely acceptable although it is preferred to heat the slurry to an elevated temperature of the order of 70 to 90° C. to ensure more rapid precipitation and reduction.

The water soluble noble metal compound may be a halide, acetate, nitrate, or other soluble salt of any noble metal, but preferably platinum or palladium. preferably, the chloride or nitrate are used. The chloride salt is commercially available in the form of an acidic aqueous solution and provides a convenient starting point for the process of this invention. Solutions of this type are extremely acidic having a pH in the range of about 0 to 3 to prevent hydrolysis. When other noble metal salts are used, such as the acetate or nitrate, it may be necessary to add an acidic material to lower the pH of the solution.

The carbon to be used should be of fine particulate quality for maximum hydrogenation activity in the range of 12 minutes or less. While powders are preferred, the method of this invention would conceptually also extend to carbon or other supports such as are conventionally used in the form of particles, granules, pellets and other particulate forms. It is preferred to use carbon powders wherein 80% of the particles are of 1–10 micron diameter and 100% are under 100 micron diameter. To obtain high surface area catalysts, i.e. on the order of 2000 m.$^2$/gm., the pore volume (calculated from pore radius and pore distribution) should be about 0.38 cc./gm. which is based on pore size (radius) of about 15–3000 A. Such a surface area is found with catalyst powders having particle sizes such that all the particles have diameters from 1 to 100 micron.

The precipitant can include most basic substances known in the prior art. In this invention, it is preferred to use an alkali or alkaline earth hydroxide, carbonate or bicarbonate; preferably lithium, sodium, potassium, barium, or cesium hydroxide in the form of a 5–50%, preferably 30% solution. It is generally added in varying quantities to raise the pH of the solution from an acidic to a basic (pH of 7-13) condition. It is frequently necessary to add more precipitant during processing to maintain the pH at a given level.

The promoters found useful according to this invention are selected from metals of atomic numbers 23-25 in their higher valent state, e.g. chromium, vanadium, and manganese. They generally are present in the final catalyst as insoluble metal oxides or hydroxides wherein the metal has a lower valency state than when first added although they may also be fully reduced to the metallic state as well. When first added, they should preferably be in their highest valency state but any state above the lowest possible (+2) is feasible. To be water soluble, the chromates, permanganates, and vanadates are preferred. These promoters are preferably added in minor quantities by weight, typically on the order of 0.5 to 3% by weight of the total catalyst. This invention is found to cover great ranges of noble metal to promoter atomic ratios and it is found that for a given quantity of noble metal, an excess, equivalent, or deficient amount of promoter can be used. Thus, the invention is seen to extend to catalysts wherein technically the noble metal is a promoter for Cr, Mn, or V. The exact proportion will vary with the amount of noble metal used on the catalytic support. The term high valent as used herein, includes all but the lowest valency of Cr, V, and Mn, preferably the highest, $Cr^{+6}$, $V^{+5}$, and $Mn^{+7}$. It also includes high valent peroxy and per sulfate radicals and other known multi-valent radicals containing the high valent metals. The term lower valent as used in reference to the promoters after reduction also includes the non-valent metallic state.

By addition of a precipitant, the soluble noble metal compound and metallic promoter are hydrolyzed to insoluble hydroxides which deposit on the carbon support present in the slurry. To obtain the catalyst in active form, the noble metal hydroxide must be reduced to metal and the promoter must be reduced to a lower valency. This can be effected by adding a reducing agent to the precipitated materials. It is preferable to add an excess of the theoretically required quantity of reducing agent and to use a reducing agent which is soluble in water as it is preferably added to the slurry. Any conventionally used reducing agent, such as formaldehyde, hydrazine, sodium formate, or hydroxy-aldehyde compound (e.g. glucose) may be used. Of course hydrogen is also suitable.

It is found that by using the higher valent promoter, the hydrolyzed high valent promoter is reduced to a lower valency whereas if a low valent promoter of atomic number 23-25 or another promoter is used, no reduction occurs. In these cases, mere hydrolysis occurs giving gelatinous, difficulty filtered, catalysts.

After precipitation and reduction, the final catalyst is recovered from solution by filtration and the filtered product is dried in a vacuum drier or oven preferably under an atmosphere of nitrogen or hydrogen, excluding oxygen, to avoid oxidation of the noble metal. Herein lies a major advantage of this invention since washing and filtering are very easy when no gelatinous precipitant (promoter) is formed. The catalyst can be used as filtered or the water content can be reduced prior to use. The material is preferably packaged and shipped in the wet state.

The invention herein is moreover found to provide increased activity for all the typical noble metal on carbon combinations. It is known in the art to use 0.1–25% by weight noble metal deposited on the support. The concentration of noble metal may be controlled by varying the quantity of soluble noble metal compound added initially. It is also known to form low concentration catalysts, e.g. 1% metal, by making a high, e.g. 10% metal, catalyst and diluting it with added carbon powder. All such concentrations and techniques may be used in this invention.

For purposes of this invention, catalytic activity is defined as the time, in minutes, required for a given sample of catalyst to reduce hydrogen pressure from 50 p.s.i.g. to 35 p.s.i.g. in the presence of maleic acid. The specific method for determining the activity, is as follows. A sample of catalyst is dried within 5 minutes to 50% water and a sample containing about 25 mg. of noble metal is charged to a 500 ml. hydrogenating flask under a nitrogen atmosphere. Then a solution of 23.3 g. of maleic acid in 100 ml. of methanol is charged to the flask. This amount of maleic acid, when completely reduced, causes a pressure drop from 50 p.s.i.g. to 35 p.s.i.g. Then the nitrogen is displaced with hydrogen to 50 p.s.i.g. pressure and the reaction is started by shaking the bottle fastened in the Parr hydrogenation apparatus. The time in minutes is recorded for the pressure to drop to 35 p.s.i.g. and this reading is used as the measure of the activity of the catalyst sample. Activities on the order of 12 minutes or less are desirable for maximum efficiency.

The following examples will serve to further illustrate this invention.

EXAMPLE I (1) A slurry of 48 g. of carbon powder in 600 ml. of water at 80° C. is stirred for 5 minutes. To this are added 25 ml. of $PdCl_2$ solution (100 g. Pd/l. 10% HCl) which had been premixed with 2.35 g. of $CrO_3$. The mixture is stirred for 15 minutes. The pH was adjusted to 8.0 by adding 30% sodium hydroxide solution. After completion of precipitation formaldehyde (10 ml.) is added with stirring in one portion and the mixture is reheated to 80° C. and allowed to stand for one hour, while additional alkali is added to maintain a pH of 8.0. The slurry is filtered and washed five times with water to give a product containing 54% water. All filtrations were carried out under nitrogen to minimize oxidation. One half the product was vacuum dried at 80° C. to yield a free flowing powder. The catalyst had a palladium content of 5% by weight and 2.5% Cr.

About 1 gm. of wet catalyst (undried) and ½ gm. of dry catalyst was separately used to catalyze the hydrogenation of maleic acid according to the procedure described above. The activity of the wet catalyst was 6.30 minutes and the activity of dry catalyst was 8.5 minutes.

EXAMPLE II

When the procedure of Example I was repeated using varying quantities of $CrO_3$ to achieve different atomic ratios of Pd/Cr in the ultimate catalyst it was found that the activity of all such catalysts is acceptable. For convenience the activity results on 1 gm. of wet catalyst as produced are tabulated below:

| | Atomic ratio Pd/Cr | Activity, minutes |
|---|---|---|
| Example: | | |
| a | 1:2 | 8 |
| b | 1:1 | 6.5 |
| c | 1:05 | 8.25 |
| d | 1:01 | 8.5 |

In these examples the quantity of formaldehyde used to reduce the precipitated catalyst was varied in proportion to the Cr and Pd available so that about 2.5 times the theoretically required quantity was used in all preparations.

EXAMPLE III

When the procedure of Example I is repeated substituting about 3.7 gm. potassium permanganate for the 2.35 gm. $CrO_3$, the activity of 1.3 gm. of 62% water containing catalyst was about 10.5 minutes. Similarly, 3 gm. vanadic tetrafluoride may be substituted for the potassium permanganate.

EXAMPLE IV

For comparison, following the procedure in Example I, the 2.35 gm. $CrO_3$ is replaced by 3.25 gm. $CrCl_3$ (lower valent $Cr^{+3}$) and the chromic chloride is hydrolyzed to chromic hydroxide gel $[Cr(OH)_3]$ which is not reduced during formaldehyde addition. The resulting precipitant cannot be easily recovered by filtration and washing. The activity of about 1 gm. of this wet catalyst is found to be 13.15 minutes which is unacceptable.

EXAMPLE V

When the procedure of Example I is repeated using, instead of 10 ml. formaldehyde as reducing agent, an equivalent quantity (1.3 ml.) of hydrazine, the catalyst will similarly have good activity.

We claim:

1. A process for producing a carbon supported promoted noble metal catalyst containing from about 0.1 to about 25 percent by weight of noble metal and from about 0.5 to about 3 percent by weight of promoter calculated as the metal, comprising forming an acidic, aqueous slurry of particulate carbon, a water soluble noble metal salt and a water soluble promoter comprising a metallic compound capable of being converted to an insoluble form in the presence of a base wherein the metal has an atomic number of 23, 24 or 25 and is in a high valency state, adding a basic precipitant to the slurry to deposit out a noble metal material and a metallic promoter hydroxide onto the particulate carbon, thereafter adding a reducing agent to co-reduce the noble metal material to metallic form and the metallic promoter hydroxide to a state wherein the metallic component is at a lower valency and recovering the resulting catalyst in a wet state.

2. A process according to claim 1 wherein the noble metal salt is palladium chloride or palladium nitrate.

3. A process according to claim 1 wherein the noble metal is palladium or platinum.

4. A process according to claim 1 wherein the water soluble promoter is, initially, a $Cr^{+6}$ compound, a $V^{+5}$ compound, or a $Mn^{+7}$ compound.

5. A process according to claim 4 wherein the water soluble promoter is, initially, a $Cr^{+6}$ compound.

6. A process according to claim 1 wherein the noble metal salt is palladium chloride, the water soluble promoter is $CrO_3$ or potassium permanganate, and the reducing agent is formaldehyde, hydrogen, glucose, hydrazine or sodium formate.

References Cited

UNITED STATES PATENTS

| | | | |
|---|---|---|---|
| 2,857,337 | 10/1958 | Hamilton et al. | 252—447 X |
| 3,127,356 | 3/1964 | Hamilton et al. | 252—447 |
| 3,328,465 | 6/1967 | Spiegler | 252—447 X |
| 2,400,012 | 5/1946 | Littmann | 252—447 X |
| 2,823,235 | 2/1958 | Graham et al. | 252—447 X |
| 3,271,327 | 9/1966 | McEvoy et al. | 252—447 X |

PATRICK P. GARVIN, Primary Examiner

U.S. Cl. X.R.

260—537 R